US011073011B2

(12) United States Patent
Haghshenas et al.

(10) Patent No.: US 11,073,011 B2
(45) Date of Patent: Jul. 27, 2021

(54) METHODS AND SYSTEMS FOR WELLBORE INTEGRITY MANAGEMENT

(71) Applicant: Halliburton Energy Services, Inc., Houston, TX (US)

(72) Inventors: Arash Haghshenas, Spring, TX (US); Joe Eli Hess, Richmond, TX (US); Andrew John Cuthbert, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 463 days.

(21) Appl. No.: 15/763,031

(22) PCT Filed: Jul. 24, 2017

(86) PCT No.: PCT/US2017/043564
§ 371 (c)(1),
(2) Date: Mar. 23, 2018

(87) PCT Pub. No.: WO2019/022710
PCT Pub. Date: Jan. 31, 2019

(65) Prior Publication Data
US 2020/0011169 A1  Jan. 9, 2020

(51) Int. Cl.
*E21B 47/10* (2012.01)
*E21B 47/00* (2012.01)
(Continued)

(52) U.S. Cl.
CPC .............. *E21B 47/10* (2013.01); *E21B 47/00* (2013.01); *E21B 47/06* (2013.01); *E21B 47/07* (2020.05);
(Continued)

(58) Field of Classification Search
CPC .......... E21B 47/10; E21B 49/08; E21B 21/14; E21B 21/30; E21B 21/32; E21B 33/12;
(Continued)

(56) References Cited

U.S. PATENT DOCUMENTS

2003/0171879 A1\* 9/2003 Pittalwala ................. F17D 5/00
702/34
2013/0336612 A1  12/2013 Pearce
(Continued)

FOREIGN PATENT DOCUMENTS

| CN | 102495935 B | 6/2012 |
| CN | 103134855 B | 6/2013 |
| WO | 2010014471 A2 | 2/2010 |

OTHER PUBLICATIONS

PCT International Search Report and Written Opinion dated Jan. 3, 2018, issued in corresponding application No. PCT/US2017/043564 filed Jul. 24, 2017, 16 pgs.

*Primary Examiner* — Michael P Nghiem
(74) *Attorney, Agent, or Firm* — Chamberlain Hrdlicka

(57) ABSTRACT

Methods and systems for evaluating integrity of a tubular located within a wellbore are provided. The method includes measuring an operation parameter of the wellbore, measuring a feature of the tubular two or more times to produce an integrity log each time the feature is measured, and determining a tubular integrity analysis for the tubular by using the integrity logs and the operation parameter. The tubular integrity analysis contains parameter limitations for the tubular. The method also includes determining if tubular integrity is within or outside the parameter limitations. If the tubular integrity is within the parameter limitations, then determine a duration of integrity for the tubular. If the tubular integrity is outside of the parameter limitations, then determine a location on the tubular for loss of tubular integrity.

14 Claims, 2 Drawing Sheets

(51) Int. Cl.

| | |
|---|---|
| *E21B 47/06* | (2012.01) |
| *E21B 49/08* | (2006.01) |
| *G01B 21/08* | (2006.01) |
| *G01B 21/14* | (2006.01) |
| *G01B 21/30* | (2006.01) |
| *G01N 11/00* | (2006.01) |
| *G01N 17/00* | (2006.01) |
| *G01N 29/02* | (2006.01) |
| *G01N 29/22* | (2006.01) |
| *G01N 17/04* | (2006.01) |
| *E21B 19/16* | (2006.01) |
| *E21B 33/12* | (2006.01) |
| *G01K 11/32* | (2021.01) |
| *G01N 3/40* | (2006.01) |
| *E21B 47/07* | (2012.01) |

(52) U.S. Cl.
CPC .............. *E21B 49/08* (2013.01); *G01B 21/08* (2013.01); *G01B 21/14* (2013.01); *G01B 21/30* (2013.01); *G01K 11/32* (2013.01); *G01N 3/40* (2013.01); *G01N 11/00* (2013.01); *G01N 17/008* (2013.01); *G01N 17/04* (2013.01); *G01N 29/02* (2013.01); *G01N 29/22* (2013.01); *E21B 19/16* (2013.01); *E21B 33/12* (2013.01)

(58) Field of Classification Search
CPC ........ G01N 3/40; G01N 11/00; G01N 17/008; G01N 17/04; G01N 29/02; G01N 29/22; G01B 19/16
USPC ........................................................... 702/34
See application file for complete search history.

(56) References Cited

U.S. PATENT DOCUMENTS

| | | |
|---|---|---|
| 2014/0032192 A1 | 1/2014 | Zamora et al. |
| 2014/0039797 A1* | 2/2014 | Gonzales ............. G01V 99/005 702/11 |
| 2014/0214326 A1 | 7/2014 | Samuel et al. |
| 2015/0198038 A1 | 7/2015 | Bartetzko et al. |
| 2015/0323697 A1* | 11/2015 | Ohmer .................... E21B 47/08 324/333 |
| 2016/0178498 A1 | 6/2016 | Hess et al. |
| 2017/0260848 A1* | 9/2017 | Xia ....................... E21B 47/107 |
| 2018/0094519 A1* | 4/2018 | Stephens ............... E21B 47/007 |
| 2018/0179881 A1* | 6/2018 | Thompson .............. E21B 47/06 |
| 2019/0257187 A1* | 8/2019 | Aljubran ................. E21B 41/00 |

* cited by examiner

METHODS AND SYSTEMS FOR WELLBORE INTEGRITY MANAGEMENT

BACKGROUND

This section is intended to provide relevant background information to facilitate a better understanding of the various aspects of the described embodiments. Accordingly, it should be understood that these statements are to be read in this light and not as admissions of prior art.

Tubulars in the wellbore are susceptible to loss of integrity due to corrosion, erosion, scaling, exposure to cyclical fatigue through changes of temperature and pressure, as well as other factors. A leak path generally results in a loss of well management, environmental hazards, loss of asset or a well control incident. In recent years, the industry has begun focusing on the integrity of subterranean storage wells and new standards and recommended practices for gas storage facilities and injection wells. Generally, operators only examine well integrity after an issue arises to determine the cause and to plan for remedial operations. This late diagnosis of a problem can result in disaster, which may have severe environmental, economic, and human injury or death consequences. Loss of well integrity and leak path development results in uncontrolled escape of hydrocarbons or water to the surrounding environment. Fluids and gases exit the well by permeating or channeling to the surface, escape into surrounding formation, or a combination of a variety of scenarios. The flow of the hydrocarbons or water to the surface or into a nearby aquifer creates health and environmental hazards.

Therefore, there is a need for methods and systems for evaluating integrity of a tubular located within a wellbore.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Embodiments described and discussed herein include methods and systems for evaluating integrity of a tubular located within a wellbore. An operation parameter of the wellbore is measured and a feature of the tubular is measured multiple times. An integrity log is produced each time the feature is measured. The multiple integrity logs are used to determine a rate of change for the feature of the wellbore. A tubular integrity analysis for the tubular is performed by using the integrity logs and the operation parameter, as further discussed below. The tubular integrity analysis contains parameter limitations for the tubular. When the tubular integrity is within the parameter limitations, a duration of integrity is determined for the tubular. When the tubular integrity is outside of the parameter limitations, a location for loss of tubular integrity is determined on the tubular.

In the various fields of wellbores, loss of wellbore integrity, due to deterioration of tubulars, occurs by deformation, wear, corrosion, erosion or pitting, a build-up of scale, and/or other factors. Determination of the integrity of any given well during the life of the well is essential to monitor or predict and mitigate possible failures. Proactive and predictive modeling of tubular failure is a valuable tool for risk analysis and setting operational limits Additionally, remedial workover or plug and abandonment (P&A) operations can be scheduled in advance to mitigate problems while maximizing operational capabilities. Predicting tubular integrity is particularly valuable for wells that experience cyclic pressure and temperature changes, for example storage and disposal wells.

Figure 1:
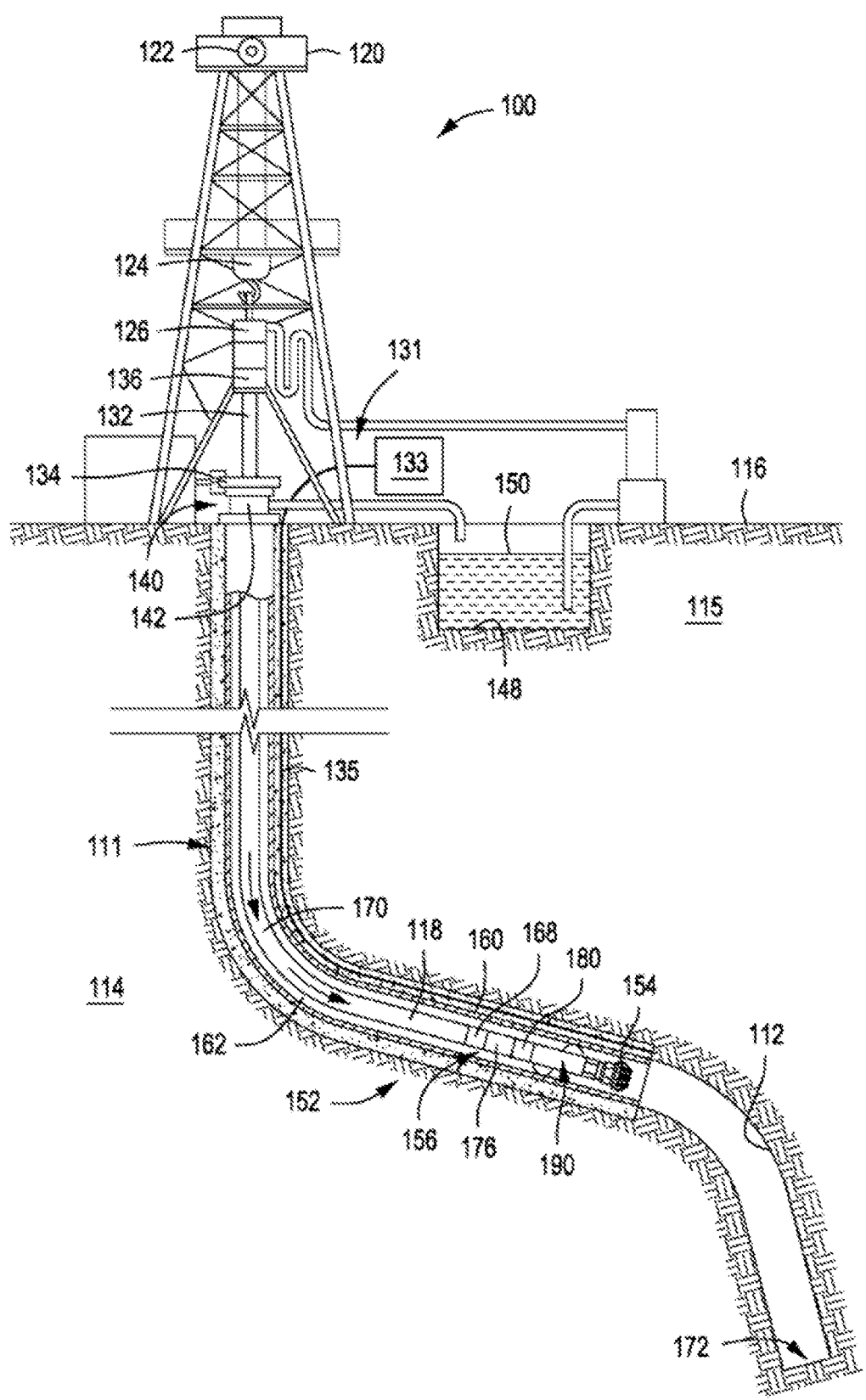
FIG. 1 is a schematic view of a wellbore drilling system for monitoring wellbore integrity in a subterranean formation, according to one or more embodiments.

FIG. 1 is a schematic view of a wellbore system 100, such as a wellbore drilling system, that can utilize methods described and discussed herein for evaluating integrity of a tubular 111 located within a wellbore 112. Although the wellbore system 100 is illustrated as a wellbore drilling system, aspects of the methods described and discussed herein can be practiced in other downhole environments, such as, but not limited to, one or more production wells (e.g., hydrocarbon, oil, and/or natural gas production wells), storage wells (e.g., hydrocarbon, oil, natural gas, or carbon dioxide), injection wells, disposal or waste storage wells, salt domes, or any combination thereof. In one or more examples, the wellbore system 100 can be or include one or more wells in a gas storage field.

The wellbore system 100 produces hydrocarbons from the wellbore 112 extending through various earth strata 115 in an oil and gas subterranean formation 114 located below the ground surface 116. The wellbore 112 can be formed of a single bore or multiple bores (not shown), extending into the subterranean formation 114, and can be disposed in any orientation, such as the horizontal, vertical, slanted, or multilateral positions deviated and can include portions thereof any combination of different orientations. It should be noted that while FIG. 1 generally depicts a land-based system, it is to be recognized that the system can be operated in subsea locations as well.

The wellbore system 100 includes a testing device 190 disposed at a lower end of a conveyance 118. The conveyance 118 contains a drill string operable from the ground surface 116 to position the testing device 190 within the wellbore 112. Alternatively, other types of conveyances are contemplated including coiled tubing, production tubing, other types of pipe or tubing strings, wirelines, or slicklines. The testing device 190 detects, monitors, or otherwise measures one or more features of the tubular 111 multiple times, such as two, three, or more times. An integrity log is produced each time the testing device 190 measures the feature. Once two, three, or more integrity logs are produced, a rate of change of the feature of the tubular can be calculated or otherwise determined. The feature of the tubular is at least one of corrosion on the tubular, roughness on the tubular, pits on the tubular, deformation of the tubular, scales within the tubular, flow restrictions within the tubular, tubular wall thickness, tubular inner diameter, or any combination thereof. Further details and description for the various features of the tubulars, including process techniques, tools, systems, and/or related equipment, are provided below.

The wellbore system 100 includes a derrick or drilling rig 120. The drilling rig 120 includes a hoisting apparatus 122, a travel block 124, and a swivel 126 for raising and lowering the drill string 118, another conveyance, and/or structure such as casing string. In FIG. 1, the conveyance 118 is a substantially tubular, axially extending drill string formed of a plurality of drill pipe joints coupled together end-to-end. The drilling rig 120 can include a kelly 132, a rotary table 134, and other equipment associated with rotation and/or translation of the conveyance 118 within the wellbore 112. For some applications, the drilling rig 120 can also include a top drive unit 136.

The drilling rig 120 can be located proximate to a wellhead 140 as shown in FIG. 1, or spaced apart from the wellhead 140, such as in the case of an offshore arrangement (not shown) where the drilling rig 120 can be supported on an floating platform and coupled to a wellhead on the sea floor by a riser as appreciated by those skilled in the art. One or more pressure control devices 142, such as blowout preventers (BOPs) and other equipment associated with drilling or producing a wellbore can also be provided at the wellhead 140 or elsewhere in the wellbore system 100.

A working or service fluid source 148, such as a storage tank or vessel, can supply one or more working fluids 150 pumped to the upper end of the conveyance 118 or drill string and flow through the conveyance 118. The working fluid source 148 can supply any fluid utilized in wellbore operations, including without limitation, drilling fluid, cementous slurry, acidizing fluid, liquid water, steam or some other type of fluid. Subsurface equipment 152 can be disposed within the wellbore 112, and can include equipment such as, for example, a drill bit 154 and bottom hole assembly (BHA) 156, and/or some other type of wellbore tool.

Wellbore system 100 can generally be characterized as having the tubular 111. The tubular 111 can be or include, but is not limited to, one or more tubulars, casings, pipes, risers, tubings, drill strings, completion or production strings, subs, heads or any other pipes, tubes, or equipment that attach to the foregoing, such as conveyance 118. In this regard, the tubular 111 can also include one or more casing strings that are typically cemented in the wellbore 112, such as the surface, intermediate and inner casings 160 shown in FIG. 1. Besides the casing string, other strings, coils, tubings, lines, and/or coils can be used, for example, but not limited to, one or more completion strings, insert strings, drill strings, coiled tubings, slicklines, wirelines, drill pipes, or any combination thereof. An annulus 162 is formed between the walls of sets of adjacent tubular components, such as concentric casing strings or the exterior of the conveyance 118 and the inside wall of the inner easing 160 or the wellbore 112, as depicted in FIG. 1. The testing device 190 is disposed adjacent the casing string, e.g., the inner casings 160, for assessing a hardness of the casing string. The conveyance 118 is moved within to permit the wellbore system 100 to perform other functions such drilling.

Where subsurface equipment 152 is used for drilling and conveyance is a drill string, the lower end of the conveyance 118 can support the BHA 156, which can carry the drill bit 154 at a distal end. During drilling operations, weight-on-bit (WOB) is applied as the drill bit 154 is rotated, thereby enabling the drill bit 154 to engage the subterranean formation 114 and drill the wellbore 112 along a predetermined path toward a target zone. In general, the drill bit 154 can be rotated with the conveyance 118 from the rig 120 with the top drive 136 or rotary table 134, and/or with a downhole mud motor 168 within the BHA 156. The working fluid 150 pumped to the upper end of the conveyance 118 flows through the longitudinal interior 170 of the conveyance 118, through the BHA 156, and exit from nozzles formed in the drill bit 154. When the drill bit 154 is positioned to rotate at a bottom end 172 of the wellbore 112, the working fluid 150 can mix with formation cuttings, formation fluids and other downhole fluids and debris to form a drilling fluid mixture that can then flow upwardly through the annulus 162 to return formation cuttings and other downhole debris to the ground surface 116.

The BHA 156 and/or the drill conveyance 118 can include various other tools such as mechanical subs and directional drilling subs. The BHA 156 illustrated in FIG. 1 includes a power source 176, and measurement equipment 180, such as measurement while drilling (MWD) and/or logging while drilling (LWD) instruments, detectors, circuits, or other equipment to provide information about the wellbore 112 and/or the subterranean formation 114, such as logging or measurement data from the wellbore 112. Measurement data and other information from tools is communicated using electrical signals, acoustic signals or other telemetry that can be converted to electrical signals at the rig 120 to, among other things, monitor the performance of the BHA 156, and the drill bit 154, as well as monitor the conditions of the environment to which the BHA 156 is subjected. The measuring equipment 180 is communicatively coupled the testing device 190, and is operable for receiving, processing, and/or communicating data about the tubular feature or rate of change of the tubular provided by the testing device 190 as described and discussed herein. In one or more configurations, the conveyance 118 is a wireline or slickline, e.g., the conveyance 118 can be employed to position the testing device 190 adjacent the tubular 111, such as production tubing in a completion assembly to assess or otherwise measure one or more features of the tubular 111.

The fiber optic sensing system 131 contains an interrogator unit 133 connected to one or more fiber optic cables 135. The interrogator unit 133 may be located at the ground surface 116 of the wellbore 112. The fiber optic cable 135 can be positioned along the interior and/or exterior of the tubular 111. For example, the fiber optic cable 135 can be coupled to the interior surface and/or the exterior surface of the tubular 111. If the fiber optic cable 135 is located outside of the tubular 111, the fiber optic cable 135 is typically clamped before being cemented into position. The clamps (not shown) holding the fiber optic cable 135 in place usually have a certain amount of metal mass that can be detected using electro-magnetic unit or a current detector to prevent accidental perforation of the fiber optic cable 135. The fiber optic cable 135 can include any combination of lines (e.g., optical, electrical, and hydraulic lines) and reinforcements. Multiple fibers within one fiber optic cable 135 can offer redundancy and/or the ability to interrogate with different instrumentation simultaneously.

The fiber optic sensing system 131 can be or include, but is not limited to, fiber optics-based distributed systems such as distributed temperature sensing (DTS), distributed acoustic sensing (DAS), and other sensing systems based on, for example, interferometric sensing. The fiber optic sensing system 131 utilizes electro acoustic technology ("EAT") sensors and sensing technology and is in operable communication with one or more sensors, processing circuitry, and/or transducers or acoustic signal generators. Exemplary sensors can be or include, but are not limited to, one or more pressure sensors, temperature sensors, flow rate sensors, pH meters, acoustic sensors, vibration sensors, seismic sensors, or any combination thereof. The EAT sensors can be used in fiber optic sensing in which any number of downhole sensors, electronic or fiber optic based, can be utilized to make the basic parameter measurements, but all of the resulting information is converted at the measurement location into perturbations or a strain applied to the fiber optic cable 135 that is connected to the interrogator unit 133. The interrogator unit 133 may routinely fire optical signal pulses downhole into the fiber optic cable 135. As the pulses travel down the fiber optical cable back scattered light is generated and is received by the interrogator. The perturbations or strains introduced to the fiber optical cable 135 at the location of the various EAT sensors can alter the back propagation of light and those effected light propagations can then provide data with respect to the signal that generated the perturbations.

It is to be recognized that wellbore system 100 is merely exemplary in nature and various additional components can be present that have not necessarily been depicted in the Figures in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, or any combination thereof. Such components can also include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, or valves), logging tools and related telemetry equipment, actuators (e.g., electromechanical devices or hydromechanical devices), sliding sleeves, production sleeves, screens, filters, flow control devices (e.g., inflow control devices, autonomous inflow control devices, or outflow control devices), couplings (e.g., electro-hydraulic wet connect, dry connect, or inductive coupler), control lines (e.g., electrical, fiber optic, or hydraulic), surveillance lines, drill bits and reamers, sensors or distributed sensors, downhole heat exchangers, valves and corresponding actuation devices, tool seals, packers, cement plugs, bridge plugs, other wellbore isolation devices or components, or any combination thereof. Any of these components can be included in the systems and apparatuses described above and depicted in FIG. 1.

Figure 2:
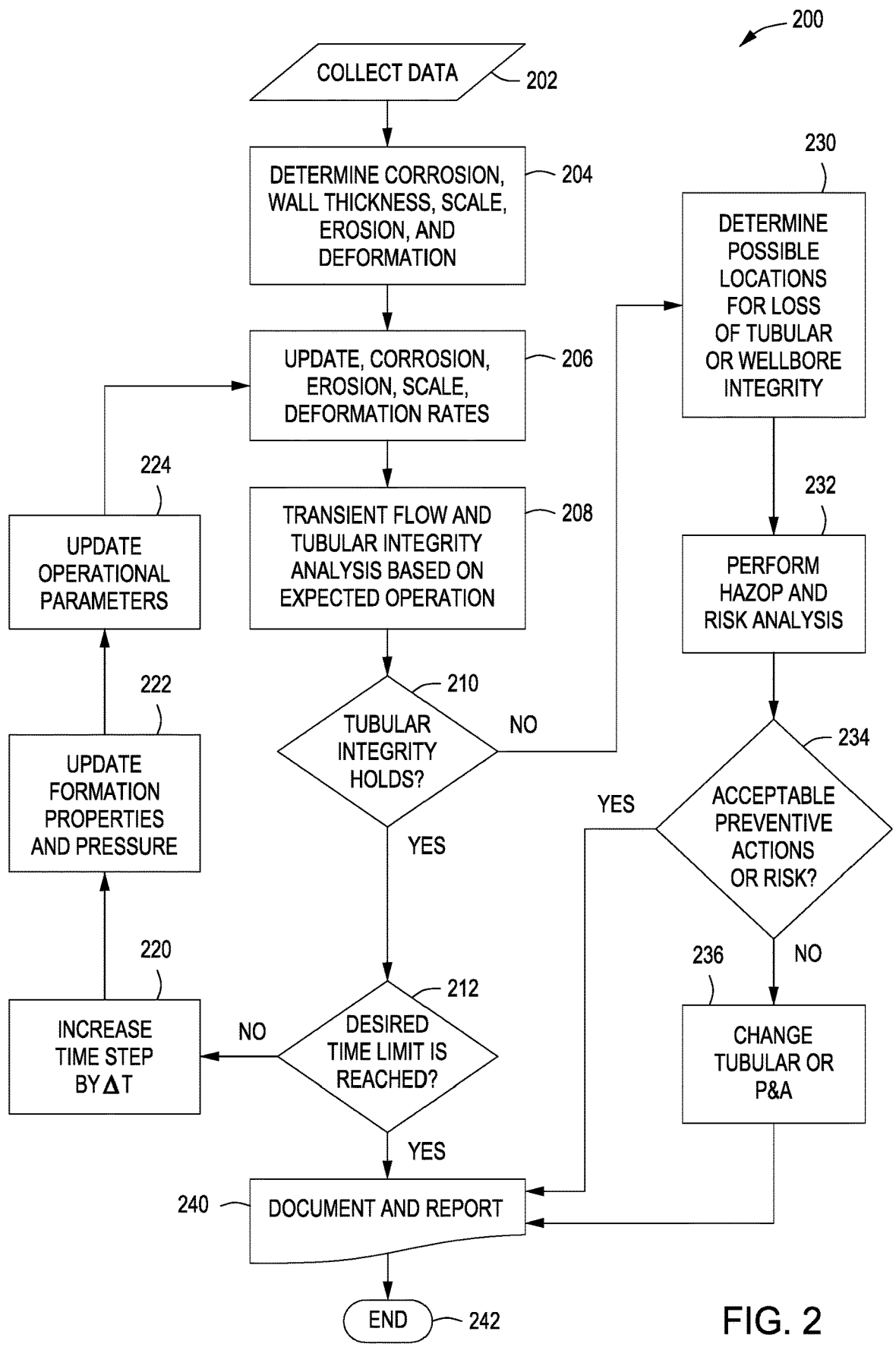
FIG. 2 depicts a flow chart of an exemplary process for evaluating integrity of a tubular located within a wellbore, according to one or more embodiments.

FIG. 2 depicts a flow chart of a process 200 used to evaluate integrity of a tubular located within a wellbore, updating parameters, and performing analysis based on expected operations. The process 200 applies logging data to forecast well or tubular integrity and risk assessment. The process 200 can be semi-automated to improve the efficiency of data collection and simulation time. In addition to the analysis and forecasting of the well tubular integrity, in some configurations, the system for conducting process 200 includes a fiber optic sensing system and pressure and/or other sensors for early leak detection.

At 202, collect data. One or more operation parameters of the wellbore are measured, calculated, monitored, or otherwise determined. Operation parameters of the wellbore include factors that the wellbore and the tubular are experiencing during active operation as well as during lifetime duration. The operation parameters are inside and/or outside of the tubular. Operation parameters of the wellbore to measure and monitor can include one or more properties of a fluid (e.g., working fluid, downhole fluid, or stored fluid) within the tubular. These fluid properties can be or include, but are not limited to, one or more of temperature, pressure, flow rate, density, composition, pH, or any combination thereof. Other operation parameters of the wellbore to measure and monitor can include one or more properties experienced from the outside of the tubular, such as from the surrounding environment. The surrounding environment can be or include, but is not limited to, the earth (e.g., rocks or soil), subterranean fluids (e.g., working fluid, downhole fluid, stored fluid, water, or gas) or any combination thereof. These surrounding environmental properties can be or include, but are not limited to, one or more of temperature, pressure, flow rate, density, composition, pH, or any combination thereof.

Each of the operation parameters is measured by one or more sensors. In some configurations, the sensors are operably coupled to one or more fiber optic cables extending downhole in the borehole. The fiber optic cable is positioned inside and/or outside of the tubular. The fiber optic cable is part of the fiber optic sensing system that detects and measures changes in the pressure and/or temperature profiles in the wellbore and can be used as a tool for early detection of leak paths in the wellbore. Each sensor in the fiber optic sensing system can be or include, but is not limited to, a pressure sensor, a temperature sensor, a flow rate sensor, a pH meter, an acoustic sensor, a vibration sensor, a seismic sensor, hybrids thereof, or any combination thereof.

At 204, determine or measure one or more features of the tubular. The feature of the tubular can be or include, but is not limited to, one or more of the following: corrosion on the tubular, erosion of the tubular, roughness and/or pits on the tubular, deformation of the tubular, scales within the tubular, flow restrictions within the tubular, tubular wall thickness, tubular inner diameter, tubular outer diameter, or any combination thereof. To determine or measure the one or more features, a testing device is conveyed or otherwise introduced into the tubular. The testing device measures the feature of the tubular two or more times (at 204 and 206) and an integrity log is produced each time the feature is measured.

At 206, update measurements of the feature and integrity log to calculate, update, or otherwise determine rates of change for any of the features. The tubular integrity analysis provides the current status of each of the one or more measured features and includes a rate of change of each measured feature of the tubular. From 204 and/or 224, make a second, a third, or additional measurements to the feature of the tubular and produce an integrity log each time the feature is measured. The rate of change of the feature of the tubular is determined with two or more integrity logs and can be updated when additional integrity logs are factored into the rate. The rate of change (increasing, decreasing, or no change) of the feature of the tubular can be or include, but is not limited to, one or more of the following: rate of corrosion, erosion, roughness, pitting, and/or deformation on/to the tubular, rate of buildup of scales within the tubular, rate of changing flow restrictions within the tubular, rate of changing tubular wall thickness, tubular inner diameter, and/or tubular outer diameter, or any combination thereof.

At 208, determine a transient flow and casing integrity analysis based on expected operation via the operation parameters. A tubular integrity analysis for the tubular can be performed by using the integrity logs and the operation parameter to calculate or otherwise determine the current status of tubular relative to each of the measured features in combination with the operation parameters. The tubular integrity analysis contains one or more parameter limitations for the tubular. In one or more embodiments, the integrity logs and the operation parameter are entered into a transient program or software package used to perform the tubular integrity analysis. The transient program or software package is loaded on one or more computers or computer network. One transient program that can be used to calculate the tubular integrity analysis is the WELLCAT™ casing design software, commercially available from Halliburton Energy Systems, Inc. Transient flow is a condition where the fluid or tubing has not reached its equilibrium condition with regards to pressure, temperature, and mass flow rate, such that steady state flow is in full equilibrium.

At 202, 204, 206, and/or 208, input data is measured, calculated, or otherwise determined and can be used at 202, 204, 206, 208, and/or other portions of process 200. Exemplary input data can be or include, but is not limited to, one or more of the following: caliper data for inner diameter (ID) of the tubular, data for outer diameter (OD) of the tubular, corrosion, pits, deformation, scales, restrictions; electromagnetic shift-change data for metal thickness of the tubular, scales detection, metal loss on inside and/or outside surfaces of the tubular; flux leakage data for any of the aforementioned data; ultrasonic data for tubular radius and thickness; operational data including fluid type or composition, flow rate, pressure, temperature, density, pH; tubular and coupling specifications; cementing and well isolation data; and fatigue of the tubular.

At 210, determine if tubular integrity is within the parameter limitations (e.g., the tubular does not leak or is not physically compromised at conditions of the operation parameters) or outside the parameter limitations (e.g., the tubular leaks or is physically compromised at conditions of the operation parameters)? If yes, the tubular integrity is within the parameter limitations, then determine a duration of integrity for the tubular at 212. Alternatively, if no, the tubular integrity is outside of the parameter limitations, then determine a location on the tubular for loss of tubular integrity at 230. The tubular leaks when a fluid can permeate into or out of the tubular. The tubular is physically compromised if the tubular breaks, bursts, come apart or disassociates, collapses, or otherwise fails.

For Minimum Internal Yield Pressure (MIYP), each tubular has a burst and collapse rating, tension, compression or tri-axial stress envelope. If the casing is subjected to internal pressure higher than external, then the casing is exposed to burst pressure loading. Burst pressure loading conditions occur during well control operations, casing pressure integrity tests, pumping operations, and/or production operations. The MIYP of the pipe body is determined by the internal yield pressure standard, as provided in the API Bulletin 5C3, Formulas and Calculations for Casing, Tubing, Drill pipe, and Line Pipe Properties, 1999.

Collapse is an inelastic stability failure or an elastic stability failure independent of yield strength. If external pressure exceeds internal pressure, the casing is subjected to collapse. Such conditions may exist during cementing operations, trapped fluid expansion, or well evacuation. Collapse strength is primarily a function of the material yield strength and the material slenderness ratio, D/t. The tri-axial criterion is based on elastic behavior and the yield strength of the material.

At 212, determine if the tubular integrity and the duration of integrity (e.g., desired time the tubular integrity is maintained by the tubular) are within the parameter limitations? If yes, then a finalized evaluation report containing the tubular integrity and the duration of integrity is prepared at 240. If no, then increase time step at 220.

In some example, the duration of integrity can last for the entire lifecycle of the well. The integrity of the casing is based on the properties of the wellbore tubular itself and determined by the environment that it is being used in. Various factors are considered, such as, but not limited to, wellbore fluid, temperature fluctuations, pressure fluctuations, tectonic activity, ancillary operations (e.g., fracturing operations), or any combination thereof.

At 220, increase time step by adjusting the interval between the process steps. The time step is increased when the tubular integrity is within the parameter limitations (at 210) and the duration of integrity is outside of the parameter limitations (at 212). To adjust or otherwise increase the time step, shorter logging intervals can be used by increasing the frequency of stations logged in the well.

At 222, update formation properties and pressure and at 224, update operational parameters. For 222 and 224, the tubular integrity is within the parameter limitations and the duration of integrity is outside of the parameter limitations. Measure or otherwise determine the feature of the tubular, wellbore, and/or formation again to produce another integrity log at 222 and measure or otherwise determine the operation parameter again at 224. Thereafter, at 206, recalculate or otherwise determine an updated value for the tubular integrity analysis for the tubular by using all of the measured integrity logs and operation parameters.

At 230, determine possible locations for loss of wellbore integrity. If tubular integrity is outside of the parameter limitations at 210, then determine one or more locations on the tubular that are susceptible for loss of tubular integrity.

At 232, perform a preventive and risk study. The preventive and risk study is performed for the wellbore and surrounding environment (e.g., earth or formation) adjacent the wellbore to produce a standard. The preventive and risk study can be or include, but is not limited to, a hazard and operability (HAZOP) study, a risk analysis, or a combination thereof.

The HAZOP study is a structured and systematic examination of a planned or existing process or operation of the wellbore and/or tubular in order to identify and evaluate problems that may represent risks to the environment, personnel, and/or equipment in a specified area. During the HAZOP study, the wellbore and/or tubular are analyzed and/or reviewed to determine issues that may otherwise not have been found. Risk analysis can be used before, during, and/or after the decision steps of the HAZOP study.

At 234, determine acceptable preventive action or acceptable risk. That is, determine if a preventive action or a risk analysis is within or outside the standard of the preventive and risk study. If at least one result of the preventive action or the risk analysis is within the standard established by the preventive and risk study, then prepare a finalized evaluation report containing at least one of the preventive action, the risk analysis, or a combination thereof at 240. If the results of the preventive action and the risk analysis are outside of the standard of the preventive and risk study, then action on the tubular is taken at 236. The preventive action and the risk analysis are determined by each operator to establish whether or not the system is within or outside the standard of the preventive and risk study based on the grade and weight of the tubular being used and the dynamic wellbore conditions.

At 236, take action with the tubular outside of the standard of the preventive and risk study. In one or more examples, at least a portion or section of the tubular or the whole tubular outside of the standard is changed or otherwise replaced with a portion or tubular that meets the standard. Alternatively, conduct a plug and abandonment (P&A) operation on the tubular. Once the tubular is repaired or replaced, or in the alternative, plugged and abandoned, the evaluation report is finalized at 240.

At 240, prepare a finalized evaluation report for the tubular in electronic and/or printed form. The evaluation report may include data for the tubular integrity and the duration of integrity, information about a repaired or replaced tubular, or information about a plugged and abandoned tubular, as applicable to the results of process 200.

At 242, exit or cease the process 200.

Proactive and predictive modeling evaluates the well or tubular integrity and provides risk-based evaluation during the expected operation. Consecutive data points can be used to provide a risk based model for the well or tubular integrity during forecasted operation. Based on the analysis, an appropriate time period for testing can be proposed. The forward forecasting of the well or tubular integrity provides opportunity to optimize operational schedule and minimize unnecessary non-productive time. If the risk of losing well or tubular integrity is relatively great, testing and analysis may be implemented more frequently relative to when the risk of losing well or tubular integrity is less.

The tubular integrity depends on several factors affecting physical reliability and operating conditions. A combination of tubular inspection logs and anticipated or measured operational conditions are used to forecast tubular integrity and, if based on the analysis of operational limits, can be set to mitigate loss of tubular integrity. Downhole logging tools and data collection systems employed to evaluate the condition of tubulars in the wellbore can be or include, but are not limited to, one or more calipers, flux-leakage tools, electromagnetic phase-shift tools, ultrasonic tools, or combinations thereof. Each tool provides certain information about deformation, thinning, corrosion, defects of tubulars, or other features of the tubular. In some example, additional tools, such as noise logs, temperature logs, and/or acoustic logs, are available to detect leaks.

The methods described and discussed herein uses the data from a combination of two or more tubular integrity logs to determine the integrity of the tubulars in the wellbore and provides a risk assessment based on the planned operation. Each integrity log has limitations within a certain confidence level, but combinations of two or more logs, with known operational conditions, are used to determine the condition of the tubular more accurately, hence distinguishing between scale and corrosion, for example, or to determine deformation, the rate of corrosion or erosion to the inside or outside of the tubular, wall thickness and scaling. The confidence level in the output of the logging data will depend on, but is not limited to, the accuracy of the logging tool, the frequency of the logging data, the quality of the interpretation of the data, and/or combinations thereof.

The resolutions of log data are different. After considering the data resolution and error uncertainty, separate data files are generated to represent various risk considerations, including most probable and worst-case conditions of the tubular. In one or more examples, the log data includes gyro data for well survey. The comparison of tubular survey with the original hole survey provides information on the presence of buckling or misalignment.

The data and rates are corrected and/or updated as more data becomes available through the life of the well. The data from the logs are used to update tubular burst, collapse and tensile strength ratings. Corrosion and scaling affect, tubular roughness, and restriction in the flow area which consequently affects operation pressures and pressure profile in the tubular are estimated. The tubular wall thickness, corrosion, scale, and erosion data collected from logs are input data that is incorporated into a transient program for validating tubular integrity for a given well over a set period of time. Corrosion, erosion, and scale rates can be either estimated or predicted by using log and well operation histories, which increase the accuracy of the predictive tubular integrity during the future operation. The result is presented in both deterministic and risk-based analysis for evaluating tubular integrity.

Data from the logs can be used to update tubular burst ratings, collapse ratings, and/or tensile strength ratings. From the data in the first query and given a period of time, it can be expected that there will be some deterioration of the tubular from the original new condition of the tubular. When diagnostic runs are subsequently used to evaluate the tubular condition or state at that given time, the new dimensions are recorded from which new or updated tubular burst, collapse, and/or tensile strength ratings can be determined.

Operational analysis of the well system includes transient modeling to analyze pressure and heat transfer during operations of the well. Also, cyclical heat transfer and pressure changes in multistring completions are also analyzed. WELLCAT™ casing design software, commercially available from Halliburton Energy Systems, Inc., is a transient program that provides solutions for tubular design based on the status quo and is used for critical well design. The program is capable of analyzing operations in multistring wells and calculating heat transfer and fluid pressure buildup behind tubulars. The program can be used to update the strength of tubular based on the tubular outer diameter (OD) and inner diameter (ID), therefore the interpreted tubular geometry can be used to calculate the strength of specified tubular properties and thus perform tubular integrity analysis. Transient numerical simulation is performed for a sequence of operations for any specific period of time to track heat transfer, displacement of different fluids and pressure profile in the wellbore or tubulars in order to evaluate the integrity of the tubular and connections. The condition of the tubulars can include modeling corrosion rate, scaling rate, erosion rate, deformation rate, and other rates described and discussed herein. The condition of tubular connections is also included in the analysis.

In one or more embodiments, a method for evaluating integrity of the tubular is provided and includes measuring an operation parameter of the wellbore, measuring a feature of the tubular to produce an integrity log each time the feature is measured, and determining a rate of change of the feature of the tubular from two or more integrity logs. A tubular integrity analysis for the tubular is calculated by using the integrity logs and the operation parameter. The tubular integrity analysis contains parameter limitations for the tubular. The method also includes either determining a duration of integrity for the tubular if tubular integrity is within the parameter limitations, or determining a location on the tubular for loss of tubular integrity if tubular integrity is outside of the parameter limitations.

In some embodiments, tubular integrity is outside of the parameter limitations and a location on the tubular for loss of tubular integrity is determined. A preventive and risk study is performed for the wellbore and surrounding earth adjacent the wellbore to produce a standard. Once a preventive action or a risk analysis is determined to be outside the standard of the preventive and risk study, at least a portion of the tubular or the whole tubular is changed or replaced. Alternatively, the wellbore is plugged and abandoned.

In another embodiment, a system for performing the methods for evaluating tubular integrity, as described and discussed herein, can include a testing device configured to measure the feature of the tubular two or more times to produce the integrity log each time the feature is measured, a sensor operably coupled to a fiber optic cable and configured to measure the operation parameter, and a transient program configured to calculate a tubular integrity analysis from the integrity logs and the operation parameter.

Understanding and predicting well or tubular integrity is used to determine the level of exposure to risk and possible location of loss of tubular integrity. Therefore, one or more preventative actions taken to mitigate the risk in advance increases safety, reduces environmental effects, and protects assets. The result of the evaluation is used to protect the well or tubular integrity by optimizing operational conditions and determining a maintenance schedule for remedial workover operations or the need for well abandonment.

An integrity log is produced each time the feature is measured and multiple integrity logs are used to determine a rate of change for the feature of the wellbore. The tubular integrity analysis for the tubular is performed by using the integrity logs and the operation parameter. In one or more embodiments, casing can be inspected and casing inspection logs can be generated by one or more of techniques which include, but are not limited to, one or more cased-hole calipers, one or more flux-leakage tools, one or more electromagnetic phase-shift tools, one or more ultrasonic tools, or any combination thereof.

Ultrasonic radial-cement-evaluation devices and modified open hole-imaging devices can also be used to evaluate casing for indications of potential collapse of casing, thinning of casing, internal or external metal loss, or any combination thereof. Echo amplitude and travel time provide images of the condition of the inside casing surface (e.g., buildup, defects, and/or roughness, such as pitting and/or gouges).

The acoustic caliper generated from the pulse/echo travel time provides the casing inside diameter, such as an average of all transducers or a single circumferential scan. An estimate of casing ovality is obtained using the maximum and minimum measurements. Then, if the nominal value of the outside casing diameter is assumed, changes in thickness can be calculated and internal defects identified. Frequency analysis determines the casing resonant frequency from the acoustic waveform. Casing thickness is inversely related to the resonant frequency. By combining travel time and resonant-frequency measurements and using data from all available transducers (or a single scan), presentations showing casing cross-sections are used to highlight casing damage such as: collapse of casing, thinning of casing, internal or external corrosion metal loss, and or any combination thereof.

Cased-hole calipers, such as multifinger calipers, are used to identify changes in casing diameter as indicators of wear and corrosion. These calibers are also used to monitor casing deformation. Calibers can have from one, two, three, five, or about 10 to about 20, about 40, about 60, or about 80 spring-loaded feelers or fingers, depending on the nominal casing diameter. Different multifinger caliper tools can log casing sizes from about 4 inches to about 20 in. Smaller tools can be used for tubing inspection. Each hardened finger can measure the internal casing diameter with a radial resolution of a few thousandths of an inch (e.g., about 0.001 in to about 0.01 in) and a vertical resolution of a few hundredths of an inch (e.g., about 0.01 in to about 0.09 in) at an approximate logging speed of about 1,800 ft/hr. Measurements are taken many times per second for each finger, giving a typical spatial-sampling interval of approximately 0.15 in as the tool travels up the borehole. A finger extends and encounters a pit or hole and retracts where scale is present or there has been partial collapse. The tool also indicates which finger is the one on the highest side of the well. Moreover, fingers can be grouped azimuthally. All these data can be combined with the measurements of diameter to produce a 3D picture of the casing, including cross-sectional distortions and changes in the trajectory of the well axis as small as 0.01°. The data can be either transmitted to the surface where the tool is run on a wireline or stored downhole where the tool is deployed on a slickline.

Types of multifinger calipers can be or include, but are not limited to, mechanical calipers and/or electronic calipers, although the distinction is misleading because all such calipers are mechanical in their deployment. The difference is in the way in which data are recorded. Calipers that are truly mechanical in that they were operate on a slickline and use a scribe chart for downhole data recording. These mechanical calipers have high temperature ratings because they are not limited by the ratings of downhole electronics (e.g., about 600° F.) for the Kinley caliper, commercially available from the Expro Group. The tool can convert the mechanical data into electronic information for downhole memory storage or for transmittal uphole for real-time data display. Operating temperatures for these electronic tools are typically up to 350° F.

Multifinger tools contain an inclinometer so that tool deviation and orientation can be recorded. If these meters are known, the high-quality output from modern multifinger calipers allows several image-based products to be generated. Deliverables include digital "maps" of the ovality of the casing and its internal diameter. The logs can be run and displayed in time-lapse mode to quantify the rates of corrosion or scale buildup. A digital image of variations in the inner diameter of the casing can be used for identifying corrosion. The digital image can be an electronic version of what is seen using a downhole video camera; however, the electronic image can be rotated and inspected from any angle. Artificial colors are used to bring out anomalies.

Another processed product can be the 3D shape of downhole tubulars to map the trajectory of the wellbore and to quantify casing deformation. In one example, the use of multifinger-caliper data evaluates casing deformation in primary heavy-oil production in northeastern Alberta and other places. Several postulates for formation movement can be modeled and compared with the observed casing deformations.

Flux leakage tools use a semi-quantitative method that utilizes a strong magnetic field to identify and quantify localized corrosion on the inner surfaces and/or the outer surfaces of the casing. A downhole magnet (e.g., electromagnet) fits within the casing abs produces a low-frequency or a direct-current magnetic field. The magnet can be a permanent magnet so the tool can be used on a memory string for which battery power is at a premium. Magnetic flux is concentrated within the casing, which is close to magnetic saturation. The tool can include spring-loaded, coil-type, pad-mounted sensors that are pushed close to the casing during logging. Where casing corrosion is encountered, the lines of flux "bulge out" from the casing as though the flux lines were leaking from the casing. The primary sensors pass through this excluded flux and measure the induced voltage. The amplitude and spatial extent of the sensor response is related to the volume and shape of the corrosion metal loss, thereby allowing an estimate of the size of the defect. Because the primary measurement cannot distinguish between internal and external casing defects, many tools use an additional higher-frequency eddy-current measurement that is a shallower measurement and responds only to casing flaws on the inner wall. The tool uses a separate transmitter coil. The flux-leakage and eddy-current signals are distinguished using frequency filters. The flux-leakage tools can identify localized casing defects such as corrosion patches, pits, and holes as small as about 0.2 in on the inside and/or the outside of the casing.

The electromagnetic phase-shift tool uses methods that provide an estimate of casing thickness across casing length (e.g., of about 0.5 feet to about 1.5 feet or about 0.8 feet to about 1.2 feet). Electromagnetic phase-shift tools make measurements that are averages around the circumference of the pipe. They lack the localized investigative capability of flux-leakage tools and are best used to investigate larger-scale corrosion. Essentially, a transmitter coil generates a low-frequency alternating magnetic field, which couples to a receiver coil. These tools also induce eddy currents in the surrounding casing and formation. The eddy currents generate their own magnetic field, which is phase-shifted by the presence of casing. The phase-shifted field is superimposed on the transmitted field. This total field is detected by a receiver coil. The phase shift between the transmitted and received signals is related to the thickness, electrical conductivity, and magnetic permeability of the casing. If the last two are known, the casing thickness can be determined. Higher phase shifts indicate a higher casing thickness, all other things being equal. In practice, the electromagnetic properties of the casing can vary with composition, aging, and/or stress. To overcome this problem, modern tools can include multiple sensor coils, which allow variations in the electromagnetic properties of the casing to be factored into the computation of casing thickness. Advantages are that the method is sensitive to large areas of corrosion and to gradual thinning of the casing. The sensors do not need to be in close proximity to the casing, so a single tool can examine a range of casing sizes.

The ultrasonic tools and method provide a full quantitative record of casing radius and thickness. The ultrasonic casing-inspection tools are designed for a spatial resolution. Several commercially available tools have a short-pulse 2-MHz transducer, about 0.5 inches in diameter, focused at a distance of about 2 inches from the front face of the tool. The higher-frequency measurement sharpened the spatial resolution so that internal pits of diameter of about 0.16 inches could be defined quantitatively. The velocity of sound in the borehole fluid is measured using a built-in reflector at a known offset while running into the hole. The wellsite computer calculates the internal radius from internal echo time and the measured fluid velocity. Downhole processing extracts the time difference between the internal and external echoes for an improved determination of casing thickness using the velocity of sound in steel. This information allows external casing defects to be identified Azimuthal sampling interval is about 2°. Vertical sampling interval in high-resolution mode is about 0.2 inches at a logging speed of about 425 ft/hr. The signal is attenuated by the borehole fluid, such as, but not limited to, one or more of brine, oil, or light drilling muds.

In one or more embodiments, an ultrasonic tool, commercially available from Halliburton Energy Services, Inc., uses two ultrasonic transducers, one of which rotates while the other is fixed for real-time measurements of borehole-fluid velocity. The tool operates in image mode or cased-hole mode. In image mode, the tool can be operated in open hole or in cased hole, where the tool examines only the inner casing surface. In cased-hole mode, tool determines the inner radius and the casing thickness, so that defects on the outer casing can be discerned. Waveform processing allows the evaluation of cement bonding from the same logging run.

In other examples, an acoustic analysis tool, commercially available as the Acoustic Conformance Xaminer® tool from Halliburton Energy Services, Inc., uses hydrophone array technology to locate and describe communication paths and flow areas, vertically and radially in the wellbore area in real time. The array triangulates on the sound/flow source in or around the wellbore. The array analysis helps eliminate false picks off of frequency and magnitude shows that have more to do with the well structure than the leak source. The radial locator has proven invaluable in some wells that have been logged by identifying which annulus or component of a completions system is leaking. The tool also reduces time by providing a continuous mode to quickly identify areas of interest of possible leaks in the wellbore. In addition, the tool can accomplish stationary measurements to refine and reaffirm areas where leaks are identified by monitoring activity.

In some embodiments, metal loss assessment in multiple casing strings can be performed by the Electromagnetic Pipe Xaminer® V (EPX™ V) tool, which provides intervention capabilities to help improve well surveillance with metal-loss quantification of up to five downhole tubulars. This tool operates via mono-conductor wireline, enabling more efficient wellsite operations through the use of cased-hole service equipment. This tool can use accurate High-Definition Frequency (HDF) technology to reduce diagnostic time and provide comprehensive information for monitoring programs. The magnitude and location of corrosion-induced defects are identified via HDF variance algorithms of returning electromagnetic waves. These discriminate between interior and exterior metal losses for each corresponding tubular.

The Eye-Deal Camera™ System for down hole video, commercially available from Halliburton Energy Services, Inc., provides high-resolution images that eliminate guesswork from a range of diagnostic test and troubleshooting operations. Applications of this tool and system include quality assurance inspection, gas entry, water entry, fishing operations, casing and perforation inspection, and general problem identification. The system can include a fiber optic system and can provide a continuous-feed image with excellent screen resolution. In this configuration, the camera on the tool can operate to a depth of about 14,000 feet and sustain pressures of about 10,000 psi and temperatures of 250° F. In some configurations, the system uses logging cables to transmit high-quality single images at a rate of one image per about 1 second to about 2 seconds or about 1.4 seconds to about 2 seconds. This configuration permits deeper operation and flawless performance in corrosive fluids. Operators can toggle between downview and sideview images. The system includes 360 degree sideview capability of the wellbore.

In one or more embodiments, ultrasonic tools can be operated to separately or concurrently, address objectives including casing integrity and/or cement evaluation. A further example is the Circumferential Acoustic Scanning Tool—Visualization version (CAST-V™) tool, commercially available from Halliburton Energy Services, Inc., which allows separate or simultaneous casing inspection and cement evaluation. The tool can operate in an image mode and/or a cased-hole mode. The image mode provides the scanner to evaluate the inner surface of the casing. The cased-hole mode provides circumferential maps of casing thickness and acoustic impedance are used to assure casing integrity and to distinguish between fluids and cement in the annulus.

Cement bond logs include cement placement information. The proper cement placement between the well casing and the formation is utilized to support the casing (shear bond), to prevent fluid from leaking to the surface, and/or for isolating producing zones from water-bearing zones (hydraulic bond). Acoustic logs provide the information for evaluating the mechanical integrity and quality of the cement bond.

Acoustic logs do not measure cement quality directly, rather, this value is inferred from the degree of acoustic coupling of the cement to the casing and to the formation. Properly run and interpreted, cement-bond logs (CBL) provide highly reliable estimates of well integrity and zone isolation. Just as filtrate invasion and formation alteration may produce changes in formation acoustic properties, and thus variation in acoustic logs over time, so too, cement-bond logs may vary over time as the cement cures and the cement properties change. Acoustic cement-evaluation (bond) devices can include monopole (axisymmetric) transmitters (one or more) and receivers (two or more) and can operate on the principle that acoustic amplitude is rapidly attenuated in good cement bond but not in partial bond or free pipe. These cased-hole wireline tools can measure one or more of compressional-wave travel time (transit time), amplitude (first pipe arrival), attenuation per unit distance, or any combination thereof. Some CBL tools provide omni-directional measurements, while the radial cement-evaluation tools provide azimuthally sensitive measurements for channel evaluation. When the acoustic wave generated by the transmitter reaches the casing, part of the acoustic wave is refracted down the casing (amplitude and travel-time measurement), part of the acoustic wave travels through the mud (fluid arrival), and part of the acoustic wave is refracted into the annulus and the formation and received back (formation arrival). Amplitude, measured directly or as an attenuation ratio, is the primary bond measurement and is used to provide: quantitative estimations of cement compressive strength, bond index, qualitative interpretation of the cement-to-formation interface, or any combination thereof.

Tool response can depend on the acoustic impedance of the cement, which, in turn is function of density and velocity. On the basis of empirical data, the log can be calibrated directly in terms of cement compressive strength. However, in foamed cements or when exotic additives are used, these calibrations can be inaccurate. In these situations, users are advised to consult with the logging service company regarding the appropriate calibrations. A typical cement-log presentation can include: a correlation curve (gamma ray), travel time (µsec), amplitude (mV), attenuation (dB/ft) curves, a full-waveform display (µsec), or combinations thereof. Presentation of the full acoustic waveform assists in resolving bond ambiguities arising from use of an amplitude measurement alone and provides qualitative information about the cement-to-formation bond. Waveform displays may be in: variable density (VDL) or intensity (also called microseismograms) formats, oscilloscope waves (also known as x-y or "signature"), or a combination thereof. Variable density is a continuous-depth time display of full-waveform amplitude presented as shades of black and white. Positive waveform amplitudes are shown as dark bands and negative amplitudes as gray or white bands; contrast is proportional to amplitude. On a variable-density log, free pipe and fluid arrivals (if present) are easily identified as straight dark and light lines (indicating homogenous acoustic properties) at either side of the display. The zigzag, wavy, or chevron pattern between these two arrivals is the formation signal (indicating varying acoustic transit time). In cases of poor bonding, casing-collar signals may also be identified as "w" patterns (anomalies).

A casing cement job can result in one or more of the following situations: free pipe, good bond, bond to casing only, partial bond, or any combination thereof. For example, in a first scenario, free pipe, there is no cement bond between the casing and cement. Consequently, there is no acoustic coupling with the formation and most of the transmitted acoustic energy is confined to the casing and the borehole fluid. As a result, a free-pipe acoustic signal is long-lived, high-amplitude, and/or of uniform frequency.

In a second scenario, good bond, cement is bonded to casing and to the formation to provide good acoustic coupling and most of the acoustic energy is transmitted to the formation, resulting in little (weak) to no casing signals and little amplitude until the arrival of the strong formation signal.

In a third scenario, bond to casing only, is a common condition in which cement is bonded to the casing but not to the formation. This can occur because the mudcake dries and shrinks away from cement, or because the cement did not bond with mudcake in poorly consolidated formations. In this situation, energy traveling through the casing is attenuated drastically because of the highly attenuating cement sheath. At the same time, the annulus outside the cement sheath provides poor acoustic coupling. The result is that little energy is transferred to the annular fluid and virtually none is transferred to the formation. This condition is indicated by the lack of later-arriving formation energy. A similar response can be caused by the presence of formation gas in shallow, high-porosity zones.

In a fourth scenario, partial bond, a space exists within an otherwise well-bonded casing. This may occur with the presence of a microannulus or channels within the cement. The resulting waveform is comprised of a casing signal and a formation signal; the casing signal arrives first, followed by the formation signal.

When channeling occurs, the channeling is generally localized and nonuniform; that is, the channeling occurs over relatively short intervals and can frequently be identified by variations in the amplitude response. Channeling is significant because it prevents a hydraulic seal. In contrast, a microannulus (a small gap between the casing and cement sheath) may extend over long sections of casing but may not prevent a hydraulic seal. Microannulus may result from thermal expansion or contraction of the pipe during cementing or to the presence of contaminants, such as grease or mill varnish, on the casing's exterior surface. A common practice is to run cement-bond logs with the casing under pressure to expand the casing against the cement, thereby decreasing any microannulus that might exist. If the initial log run was not under pressure and the log indicates poor bond, the presence of a microannulus can be evaluated by running a second bond log under pressure to see if there is a difference. Pressuring the casing improves the acoustic coupling to the formation and the casing signal will decrease and the formation signal will become more obvious. However, if only channeling exists, pressuring the casing will not significantly change the log. When conducting a cement evaluation, information on the type of cement used is essential. For example, foam cements, which intentionally create void spaces in the cured cement, can be misinterpreted as partial bond if normal cement is assumed.

Radial-cement-evaluation tools and methods were developed to overcome some limitations of conventional cement-bond tools and to permit more accurate evaluation of cement distribution behind casing by providing the precise location of partial bond and channeling. These tools use one or more azimuthally sensitive transducers to evaluate cement quality around the circumference of the casing. Data from these tools are presented as individual log curves or as azimuthal images ("maps") of cement quality generated by interpolating between the individual azimuthal measurements. In addition, each tool design also provides a conventional 5-ft VDL waveform measurement to provide information about the cement-to-formation bond.

The radial-evaluation-tool can include, but is not limited to, a televiewer-type tool that use a single rotating ultrasonic transducer, a tool with circular ultrasonic pulse/echo transducers arranged in a fixed helical pattern around the sonde, a multipad tool that provides six compensated attenuation measurements, a tool that includes an array of eight TR pairs arranged azimuthally around the sonde and provide compensated CBL amplitude, or any combination thereof.

The ultrasonic tools compute the acoustic impedance of the material beyond the casing. To do this, repeated acoustic pulses are directed at the casing to make it resonate in its thickness mode and the energy level (attenuation) of the decaying reflected wave is measured. Good cement bond to casing produces a rapid damping (higher impedance) of this resonance; poor cement bond results in longer resonance decay (lower impedance). Measurements from these devices are influenced by the same factors as open hole televiewer devices.

The pad device makes multiple measurements that are short-spaced, compensated, and/or azimuthal-attenuation. Because the pads are in direct contact with the casing, in contrast to ultrasonic measurements, measurements are unaffected by: gas in the borehole, fast formations, heavy-mud conditions, minor tool eccentricity, or any combination thereof.

The attenuation in each segment is measured in two directions using a pair of acoustic receivers and two transmitters. The two measurements are combined to form a result that compensates for surface roughness and/or the effects of minor residual cement on the inside of the casing.

Transmitting elements and the firing sequence are controlled to direct (steer) and enhance the acoustic-energy output of both the pad transmitters and the VDL transmitter. This has the effect of improving the signal strength of both the casing and cement-to-formation arrivals, respectively. This technique improves VDL interpretation, particularly in soft formations in which the standard VDL may wash out.

The use of new high-performance low-density, foam, and complex cements is increasing. However, the presence of gas in cement slurries, as an inert component or as contamination, may seriously affect ultrasonic-tool interpretation. New interpretation methods integrate ultrasonic and attenuation measurements from conventional tools to provide improved cement evaluation in these conditions. The latest ultrasonic tool has a conventional pulse-echo transducer plus a flexural transmitter and two flexural receivers that provide greater depth of investigation. Interpretation techniques combining these different measurements provide improved evaluation in lightweight cements, especially in the annulus, beyond the casing-cement bond.

Conventional cement-bond logs (CBLs) can include, but are not limited to, a pulsed transmitter and several receivers of acoustic energy positioned as a vertical array of transducers. The acoustic signal travels through borehole fluid, casing, cement, and the formation itself. The signal is received, processed, and displayed as a microseismogram. The recorded waveforms are presented together with the travel time and a casing-amplitude curve, which displays the amplitude of the acoustic signal that has traveled through the casing but not through the cement and formation. The waveform and amplitude data allow two bonds to be investigated. These are the bond between casing and cement and, to a lesser extent, that between cement and formation. A "straight" waveform display is traditionally interpreted to mean no cement bonding. Variations in the acoustic display are interpreted as indicating the presence of bonded cement. These displays have been enhanced by the application of statistical variance processing to ultrasonic data. CBLs indicate the top of cement, where there is unbonded pipe, and they indicate where the pipe is well cemented. However, they are not reliable as indicators of hydraulic sealing by the cement, because they cannot detect small channels therein. Part of the problem is that conventional CBL transducer arrays are vertical, whereas bonding problems need to be investigated circumferentially.

In one or more embodiments, a segmented bond tool can use six pads, on each of which there is a transducer arrangement of receivers and transmitters of acoustic energy. The pads are in contact with the casing. Energy is transmitted at one pad and is received at an adjacent pad. The pad spacing is such that the first arrival is the wave that has passed through the casing. The rate of attenuation can be computed across each 60° segment of the casing circumference. A high rate of attenuation is indicative of a good cement bonding to the casing and an absence of channels within the cement. The method allows localized zones of good hydraulic seal to be identified in a way that is independent of borehole-fluid type. The bonding between cement and formation is investigated through a CBL-type receiver array for wave-train presentation.

Ultrasonic tools can be superior to the acoustic CBLs, although ultrasonic tools can remain adversely affected by highly attenuating muds and are often grouped as "cement evaluation tools." In some example, one commercially available ultrasonic tool for cement evaluation can include an array of eight ultrasonic transducers that allow a limited radial inspection of the casing and its annulus. Some tools have a single rotating transducer that incorporates both the source and receiver of ultrasonic energy. The tool has to be centered. The data for circumferential inspection of the casing, as discussed and described above, and for the evaluation of cement bonding are obtained on the same logging pass. Acoustic energy is reflected at interfaces that correspond to changes in acoustic impedance (the product of acoustic velocity and density). The first reflection is at the casing itself. The second reflection may be at the outside of the casing. If cement is bonded to the casing, there will be a strong reflection. If there is unset cement or water behind the casing, there will be a weak reflection. The received waveform is the sum of the reflected waveform from the original burst and the exponentially decaying waveform from the resonant energy that is trapped between the inner and outer edges of the casing. By analyzing the entire waveform, an acoustic-impedance map of the cement can be constructed. This map can indicate the presence of channels and their orientations. In another example, an ultrasonic tool can operate within a range from about 200 Hz to about 700 Hz and provide a full high-resolution coverage of the casing and cement integrity. Channels as narrow as 1.2 inches can be detected. In some examples, the ultrasonic tool can operate can be operated with a CBL tool. For example, the CBL tool can read low-amplitude values in gas-contaminated cements. The ultrasonic tool cannot distinguish between gas-filled cement and fluids, but the ultrasonic tool can quantify the acoustic impedance of the cement. Therefore, the presence of gas-contaminated cement is indicated where the CBL tool reads low and the ultrasonic tool indicates fluids. If there is only gas behind the casing, the CBL tool reads high and the ultrasonic tool shows gas.

In addition to the embodiments described above, embodiments of the present disclosure further relate to one or more of the following paragraphs:

1. A method for evaluating integrity of a tubular located within a wellbore, comprising: measuring an operation parameter of the wellbore; measuring a feature of the tubular two or more times to produce an integrity log each time the feature is measured; determining a tubular integrity analysis for the tubular by using the integrity logs and the operation parameter, the tubular integrity analysis comprising parameter limitations for the tubular; and determining if tubular integrity is within or outside the parameter limitations; and wherein if the tubular integrity is within the parameter limitations, then determining a duration of integrity for the tubular, or if the tubular integrity is outside of the parameter limitations, then determining a location on the tubular for loss of tubular integrity.

2. A method for evaluating integrity of a tubular located within a wellbore, comprising: measuring an operation parameter of the wellbore; measuring a feature of the tubular two or more times to produce an integrity log each time the feature is measured; determining a rate of change of the feature of the tubular from two or more of the integrity logs; determining a tubular integrity analysis for the tubular by using the integrity logs and the operation parameter, the tubular integrity analysis comprising parameter limitations for the tubular; and either: determining a duration of integrity for the tubular if tubular integrity is within the parameter limitations; or determining a location on the tubular for loss of tubular integrity if tubular integrity is outside of the parameter limitations.

3. A method for evaluating integrity of a tubular located within a wellbore, comprising: measuring an operation parameter of the wellbore; measuring a feature of the tubular two or more times to produce an integrity log each time the feature is measured; determining a rate of change of the feature of the tubular from two or more of the integrity logs; determining a tubular integrity analysis for the tubular by using the integrity logs and the operation parameter, the tubular integrity analysis comprising parameter limitations for the tubular; determining a location on the tubular for loss of tubular integrity if tubular integrity is outside of the parameter limitations; performing a preventive and risk study of the wellbore and surrounding earth adjacent the wellbore to produce a standard; determining a preventive action or a risk analysis is outside the standard of the preventive and risk study; and changing at least a portion of the tubular or plugging the wellbore.

4. A system for performing a method of evaluating integrity of a tubular located within a wellbore, the system comprising: a testing device configured to measure the feature of the tubular two or more times to produce the integrity log each time the feature is measured; a sensor operably coupled to a fiber optic cable and configured to measure the operation parameter; and a transient program configured to calculate a tubular integrity analysis from the integrity logs and the operation parameter; and the method, comprising: measuring an operation parameter of the wellbore; measuring a feature of the tubular two or more times to produce an integrity log each time the feature is measured; determining a tubular integrity analysis for the tubular by using the integrity logs and the operation parameter, the tubular integrity analysis comprising parameter limitations for the tubular; and determining if tubular integrity is within or outside the parameter limitations; and wherein if the tubular integrity is within the parameter limitations, then determining a duration of integrity for the tubular, or if the tubular integrity is outside of the parameter limitations, then determining a location on the tubular for loss of tubular integrity.

5. The method and/or the system of any one of paragraphs 1-4, wherein determining the tubular integrity analysis comprises calculating a rate of change of the feature of the tubular.

6. The method and/or the system of paragraph 5, wherein the feature of the tubular comprises at least one of corrosion on the tubular, roughness on the tubular, pits on the tubular, deformation of the tubular, scales within the tubular, flow restrictions within the tubular, tubular wall thickness, tubular inner diameter, or any combination thereof.

7. The method and/or the system of any one of paragraphs 1-6, wherein the operation parameter comprises a property of a fluid within the tubular, and wherein the operation parameter comprises at least one of temperature, pressure, flow rate, density, composition, pH, or any combination thereof.

8. The method and/or the system of any one of paragraphs 1-7, wherein the operation parameter comprises a property outside the tubular, and wherein the operation parameter is at least one of temperature, pressure, composition, or any combination thereof.

9. The method and/or the system of any one of paragraphs 1-8, wherein measuring the operation parameter with a sensor operably coupled to a fiber optic cable.

10. The method and/or the system of paragraph 9, wherein the fiber optic cable is positioned inside or outside the tubular, and wherein the sensor is at least one of a pressure sensor, a temperature sensor, a flow rate sensor, a pH meter, an acoustic sensor, a vibration sensor, a seismic sensor, or any combination thereof.

11. The method and/or the system of any one of paragraphs 1-10, wherein measuring the feature of the tubular further comprises introducing a testing device into the tubular and measuring the feature of the tubular two or more times with the testing device to produce the integrity log each time the feature is measured.

12. The method and/or the system of any one of paragraphs 1-11, further comprising performing the tubular integrity analysis from the integrity logs and operation parameter using a transient program.

13. The method and/or the system of any one of paragraphs 1-12, wherein the wellbore is in fluid communication with at least one of a subterranean formation, a production well, a storage well, an injection well, a disposal well, a salt dome, or any combination thereof.

14. The method and/or the system of any one of paragraphs 1-13, wherein the wellbore is in fluid communication with a production well comprising at least one of hydrocarbon, oil, natural gas, or any combination thereof.

15. The method and/or the system of any one of paragraphs 1-14, wherein the wellbore is in fluid communication with a storage well comprising at least one of hydrocarbon, oil, natural gas, carbon dioxide, fluid waste, or any combination thereof.

16. The method and/or the system of any one of paragraphs 1-15, wherein the tubular integrity and the duration of integrity are within the parameter limitations, and further comprising preparing a finalized evaluation report containing the tubular integrity and the duration of integrity.

17. The method and/or the system of any one of paragraphs 1-16, wherein the tubular integrity is within the parameter limitations and the duration of integrity is outside of the parameter limitations, and further comprising: measuring the operation parameter again; measuring the feature of the tubular again to produce another integrity log; and recalculating the tubular integrity analysis for the tubular by using all of the measured integrity logs and operation parameters.

18. The method and/or the system of any one of paragraphs 1-17, wherein the tubular integrity is outside of the parameter limitations, and further comprising performing a preventive and risk study of the wellbore and surrounding earth adjacent the wellbore to produce a standard.

19. The method and/or the system of paragraph 18, wherein the preventive and risk study comprises at least one of a hazard and operability (HAZOP) study, a risk analysis, or a combination thereof.

20. The method and/or the system of paragraph 18, further comprising determining if a preventive action or a risk analysis is within or outside the standard of the preventive and risk study.

21. The method and/or the system of paragraph 20, wherein at least one of the preventive action or the risk analysis is within the standard of the preventive and risk study, and further comprising preparing a finalized evaluation report containing at least one of the preventive action, the risk analysis, or a combination thereof.

22. The method and/or the system of paragraph 20, wherein the preventive action and the risk analysis are outside of the standard of the preventive and risk study, and further comprising changing at least a portion of the tubular or plugging the wellbore.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . " Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for evaluating integrity of a tubular located within a wellbore, comprising:
   measuring an operation parameter of the wellbore via a tubular testing device and a fiber optic sensing system comprising an interrogator and a fiber optic cable coupled to the tubular;
   measuring a feature of the tubular two or more times to produce an integrity log each time the feature is measured;
   determining a tubular integrity analysis for the tubular by using the integrity logs and the operation parameter, the tubular integrity analysis comprising parameter limitations for the tubular;
   making a determination based on the tubular integrity analysis that tubular integrity is within the parameter limitations; and
   in response to the determination that the tubular integrity is within the parameter limitations, determining a duration of integrity for the tubular.

2. The method of claim 1, wherein determining the tubular integrity analysis comprises calculating a rate of change of the feature of the tubular.

3. The method of claim 2, wherein the feature of the tubular comprises at least one of corrosion on the tubular, roughness on the tubular, pits on the tubular, deformation of the tubular, scales within the tubular, flow restrictions within the tubular, tubular wall thickness, tubular inner diameter, or any combination thereof.

4. The method of claim 1, wherein the operation parameter comprises a property of a fluid within the tubular, and wherein the operation parameter comprises at least one of temperature, pressure, flow rate, density, composition, pH, or any combination thereof.

5. The method of claim 1, wherein the operation parameter comprises a property outside the tubular, and wherein the operation parameter is at least one of temperature, pressure, composition, or any combination thereof.

6. The method of claim 1, wherein the fiber optic cable is positioned inside or outside the tubular, and wherein the fiber optic sensing system measures at least one of a pressure, a temperature, a flow rate, a pH, acoustic energy, vibrations, or any combination thereof.

7. The method of claim 1, wherein measuring the feature of the tubular further comprises introducing a testing device into the tubular and measuring the feature of the tubular two or more times with the testing device to produce the integrity log each time the feature is measured.

8. The method of claim 1, further comprising performing the tubular integrity analysis from the integrity logs and operation parameter using a transient program.

9. The method of claim 1, wherein the wellbore is in fluid communication with at least one of a subterranean formation, a production well, a storage well, an injection well, a disposal well, a salt dome, or any combination thereof.

10. The method of claim 1, further comprising preparing a finalized evaluation report containing the tubular integrity and the duration of integrity.

11. The method of claim 1, wherein the duration of integrity is outside of the parameter limitations, and further comprising: measuring the operation parameter again; measuring the feature of the tubular again to produce another integrity log; and recalculating the tubular integrity analysis for the tubular by using all of the measured integrity logs and operation parameters.

12. A method for evaluating integrity of a tubular located within a wellbore, comprising:
    measuring an operation parameter of the wellbore via a tubular testing device and a fiber optic sensing system comprising an interrogator and a fiber optic cable coupled to the tubular;
    measuring a feature of the tubular two or more times to produce an integrity log each time the feature is measured;
    determining a rate of change of the feature of the tubular from two or more of the integrity logs;
    determining a tubular integrity analysis for the tubular by using the integrity logs and the operation parameter, the tubular integrity analysis comprising parameter limitations for the tubular;
    making a determination based on the tubular integrity analysis that tubular integrity is within the parameter limitations; and
    in response to the determination that the tubular integrity is within the parameter limitations, determining a duration of integrity for the tubular.

13. A method for evaluating integrity of a tubular located within a wellbore, comprising:
    measuring an operation parameter of the wellbore via a tubular testing device and a fiber optic sensing system comprising an interrogator and a fiber optic cable coupled to the tubular;
    measuring a feature of the tubular two or more times to produce an integrity log each time the feature is measured;
    determining a rate of change of the feature of the tubular from two or more of the integrity logs;
    determining a tubular integrity analysis for the tubular by using the integrity logs and the operation parameter, the tubular integrity analysis comprising parameter limitations for the tubular;
    making a determination based on the tubular integrity analysis that tubular integrity is within the parameter limitations;
    in response to the determination that the tubular integrity is within the parameter limitations, determining a duration of integrity for the tubular;
    performing a preventive and risk study of the wellbore and surrounding earth adjacent the wellbore to produce a standard;
    determining a preventive action or a risk analysis is outside the standard of the preventive and risk study; and
    changing at least a portion of the tubular or plugging the wellbore.

14. A system for performing a method of evaluating integrity of a tubular located within a wellbore, the system comprising:
    a testing device configured to measure a feature of the tubular two or more times to produce the integrity log each time the feature is measured;
    a fiber optic sensing system configured to measure the operation parameter, the fiber optic sensing system comprising an interrogator and a fiber optic cable coupleable to the tubular; and
    a transient program configured to calculate a tubular integrity analysis from the integrity logs and the operation parameter; and
    the method, comprising:
        measuring an operation parameter of the wellbore;
        measuring the feature of the tubular two or more times to produce an integrity log each time the feature is measured;
        determining a tubular integrity analysis for the tubular by using the integrity logs and the operation parameter, the tubular integrity analysis comprising parameter limitations for the tubular;
        making a determination based on the tubular integrity analysis that tubular integrity is within the parameter limitations; and
        in response to the determination that the tubular integrity is within the parameter limitations, determining a duration of integrity for the tubular.

* * * * *